United States Patent
Achlow et al.

(10) Patent No.: US 11,507,743 B2
(45) Date of Patent: Nov. 22, 2022

(54) SYSTEM AND METHOD FOR AUTOMATIC KEY PHRASE EXTRACTION RULE GENERATION

(71) Applicant: NICE LTD., Ra'anana (IL)

(72) Inventors: Inna Achlow, Kfar Sirkin (IL); Naomi Zeichner, Tel-Adashim (IL); Hila Kneller, Zufim (IL)

(73) Assignee: NICE LTD., Ra'anana (IL)

( * ) Notice: Subject to any disclaimer, the term of this patent is extended or adjusted under 35 U.S.C. 154(b) by 387 days.

(21) Appl. No.: 15/444,443

(22) Filed: Feb. 28, 2017

(65) Prior Publication Data

US 2018/0246872 A1 Aug. 30, 2018

(51) Int. Cl.
*G06F 40/211* (2020.01)
*G06F 40/289* (2020.01)

(52) U.S. Cl.
CPC .......... *G06F 40/211* (2020.01); *G06F 40/289* (2020.01)

(58) Field of Classification Search
CPC .... G06F 17/271; G06F 17/2775; G06F 40/30; G06F 40/211; G06F 40/253; G06F 40/289; G06F 40/284; G06F 40/268; G06F 40/205; G06F 40/242; G06F 16/93; G06F 16/35; G06F 40/279; G06F 40/216; G06F 16/36; G06F 16/367; G06F 16/951; G06F 40/247; G06F 40/131
USPC ............................................ 704/9, 1, 4, 10
See application file for complete search history.

(56) References Cited

U.S. PATENT DOCUMENTS

| | | | |
|---|---|---|---|
| 2005/0033566 A1* | 2/2005 | Aizawa | G06F 40/268 704/5 |
| 2007/0067153 A1* | 3/2007 | Nakagawa | G06F 40/268 704/4 |
| 2009/0319518 A1* | 12/2009 | Koudas | G06F 16/338 707/999.005 |
| 2013/0006954 A1* | 1/2013 | Nikoulina | G06F 40/44 707/706 |
| 2013/0262085 A1* | 10/2013 | Sekine | G06F 40/268 704/9 |
| 2014/0082003 A1* | 3/2014 | Feldman | G06F 40/205 707/755 |
| 2014/0358524 A1* | 12/2014 | Papula | G06F 40/51 704/9 |
| 2015/0120717 A1* | 4/2015 | Kim | G06F 16/335 707/727 |

(Continued)

OTHER PUBLICATIONS

Khoury et al. "Keyword extraction rules based on a part-of-speech hierarchy." International Journal of Advanced Media and Communication 2.2 (2008): 138-153.

*Primary Examiner* — Richemond Dorvil
*Assistant Examiner* — Rodrigo A Chavez
(74) *Attorney, Agent, or Firm* — Pearl Cohen Zedek Latzer Baratz LLP

(57) ABSTRACT

A method, system, and non-transitory processor-readable storage medium for automatic key phrase rule generation for automatic key phrase extraction including: receiving a corpus sample including a plurality of documents containing text, receiving a plurality of identified key phrases which relate to a topic of the text of at least one corresponding document; assigning a part-of-speech to each word in the corpus sample; generating a part-of-speech pattern from each identified key phrase; and generating key phrase rules.

15 Claims, 7 Drawing Sheets

(56) References Cited

U.S. PATENT DOCUMENTS

| | | | |
|---|---|---|---|
| 2016/0026621 A1* | 1/2016 | Misra | G06F 40/247 |
| | | | 704/9 |
| 2016/0132484 A1* | 5/2016 | Nauze | G06F 40/268 |
| | | | 704/9 |
| 2016/0147891 A1* | 5/2016 | Chhichhia | G06F 16/986 |
| | | | 707/734 |
| 2016/0203147 A1* | 7/2016 | Ikeda | H04L 51/216 |
| | | | 715/234 |

* cited by examiner

551

[handset faults]

[connect the headphones]

[disconnect and connect again]

[keep disconnecting]

[loose connection]

[loosing the connection]

[replacement set of handsets]

```
For each part-of-speech pattern from a part-of-
speech pattern subset, generating at least one
generated key phrase from a corpus sample.    301
```

```
For each generated part-of-speech pattern,
determining if the generated key phrase is included in
the corpus sample more than a second
predetermined amount of times.    303
```

```
For each generated part-of-speech pattern,
determining if the generated key phrase is an
 identified key phrase.    305
```

```
For each generated part-of-speech pattern, adding
the generated key phrase to a filter set if: the
generated key phrase is included in the corpus sample more
than the second predetermined amount of times, and the
generated key phrase is not an identified key phrase.    307
```

SYSTEM AND METHOD FOR AUTOMATIC KEY PHRASE EXTRACTION RULE GENERATION

FIELD OF THE INVENTION

The present invention relates to automatic generation of key phrase rules which may be used to automatically extract key phrases from a document containing text.

BACKGROUND OF THE INVENTION

A key phrase may be at least one word from a text of a document which relates to or describes a topic of that text. For example, key phrases may allow insight into the content of the document without the need to actually read the entire document.

A key phrase extraction rule may be generated based on part-of-speech patterns. A part-of-speech may be for example the category to which a word is assigned in accordance with its syntactic or lexical functions, for example a noun, a verb, an adjective, or a conjugation or any other part-of-speech from a predefined part-of-speech set. A part-of-speech pattern may include a sequence of parts-of-speech from the predefined part-of-speech set.

Key phrases in different languages, and for different text or document types such as Short Message Service ("SMS") messages, text books, journals, blog posts, novels, websites, recorded telephone calls converted to text, and emails, include different part-of-speech patterns. Accordingly, key phrase extraction and filter rules need to be learned per language and per text type of each different type of document.

Typically, part-of-speech patterns are manually created which requires language speakers with linguistic training. For example, current methods may utilize language specific manually composed part-of-speech hierarchies as well as manual key phrases. Part-of-speech hierarchy composition requires advanced linguistic expertise in the given language. Thus, these manual techniques are generally prohibitively inaccurate, time-consuming, and expensive.

SUMMARY

According to embodiments of the present invention, there is provided a method, system, and non-transitory processor-readable storage medium for automatic key phrase rule generation for automatic key phrase extraction from documents containing text. For example, the phrases such as "handset faults"; "connect the headphones"; "disconnect and connect again"; "keep disconnecting"; "loose headphone"; "losing the connection"; and "replacement set of handsets" may be key phrases from a document containing text regarding headphones not working with a handset. Accordingly, one could read, search through or use extracted key phrases for summarization, clustering and categorization tasks, or to determine which document(s) are the most relevant to whatever information they are searching for.

A key phrase extraction rule may include part-of-speech patterns such as noun+noun; adjective+noun; and verb+adverb which may be used to locate and extract key phrases, containing part-of-speech patterns from the key phrase extraction rules, from a document containing text. The key phrase extraction rule may include a filter set of key phrases which would not indicate a topic or subject of any document containing text, such as "same time" "other hand". Key phrase extraction rules may be used to identify key phrases by being used to search the text of a document for consecutive words which match a part-of-speech pattern from the key phrase extraction rule, but which are not included in a filter set of key phrases. A document containing text may be any document or collected text, such as for example an SMS message, a text book, a journal, a blog post, a novel, a website, a paper or publication, a recorded telephone call converted to text, or an email.

It is desirable to provide a system and method which can automatically generate key phrase extraction and filtering rules for extracting key phrases from a document containing text that will operate across different languages and text types.

The technology of search engines may be improved by embodiments of the invention. Further, embodiments of the present invention may improve a computer's ability to summarize, categorize, classify, and cluster documents containing text. Embodiments of the present invention may be more accurate, less-time consuming, and less expensive than current and prior methods of key phrase rule generation for automatic key phrase extraction.

Embodiments of the present invention may include receiving, by a processor, a corpus sample, the corpus sample including a plurality of documents containing text. A plurality of identified key phrases may be received by the processor. In some embodiments of the invention, at least 1,500 identified key phrases are received. Each identified key phrase may be at least one word from the text of at least one corresponding document of the corpus sample, and may relate to or describe a topic of the text of the corresponding document.

A part-of-speech may be assigned, for example, by the processor, to each word in the corpus sample. For each identified key phrase, the processor may generate a part-of-speech pattern from the identified key phrase. The part-of-speech pattern may be a sequence or series of each part-of-speech assigned to each word in the identified key phrase.

Key phrase rules may be generated by the processor by determining how many times or appearances each generated part-of-speech pattern appears in the identified key phrases in at least a portion of the at least one document; and selecting a subset of part-of-speech patterns for extracting additional key phrases from an additional document. The extracted additional key phrases may include a part-of-speech pattern from the part-of-speech pattern subset. The extracted additional key phrase may be at least one word from the text of the additional document that relates to a topic of the text of the additional document.

A selection of part-of-speech patterns may be based on how many times the part-of-speech pattern appears in the corpus sample identified key phrases, or in at least the portion of the at least one document. A part-of-speech pattern maybe selected for the part-of-speech pattern subset if the part-of-speech pattern appears more than a predetermined number or amount of times or appearances in the identified key phrases in at least the portion of the at least one document. The predetermined amount of times may be one time. For example, if a part-of-speech pattern does not appear at least 2 times in the corpus sample, that part-of-speech pattern is most likely not a useful part-of-speech pattern for identifying key phrases of the corpus sample. Other predetermined number or amount of times may be used.

In some embodiments of the invention, the part-of-speech pattern subset may not include more than one of the same exact part-of speech pattern such as (1) noun+noun; and (2) noun+noun, such that once a particular part-of-speech pattern such as noun+noun is selected for the part-of-speech pattern subset, no other part-of-speech patterns which are the same, such as noun+noun, can be further added.

Generating key phrase rules may further include generating a filter set of key phrases. The filter set of key phrases may be generated by, for each part-of-speech pattern from the part-of-speech pattern subset, generating at least one generated key phrase from the corpus sample. Each generated key phrase may be at least one word from the text of at least one document of the corpus sample, and each generated key phrase may include a part-of-speech pattern from the part-of-speech pattern subset.

For each generated key phrase, the generated key phrase may be added to the filter set if the generated key phrase is included in the corpus sample more than a second predetermined number or amount of times or appearances, and the generated key phrase is not included in the plurality of identified key phrases. The second predetermined number or amount of times may be one time, but may be another number of times or appearances.

Embodiments of the present invention may include removing, by the processor, the generated key phrase from the set of at least one generated key phrase if the generated key phrase was added to the filter set of key phrases.

Embodiments of the present invention may include determining, by the processor, an accuracy score or rating of the plurality of part-of-speech patterns. For each part-of-speech pattern in the part-of-speech pattern subset, the processor may determine an accuracy score of the plurality of part-of-speech patterns without the current part-of-speech pattern. If the accuracy score of the part-of-speech pattern is above or higher than the accuracy score of the plurality of part-of-speech patterns, the processor may remove the part-of-speech pattern from the part-of-speech pattern subset.

Determination of the accuracy score may involve determining a precision and a recall of the part-of-speech pattern. The precision and the recall may be weighted according to product needs in determining the accuracy score. For example, a high recall can be preferred when key phrases are only used for processing, document classification, or clustering; however, a high precision can be preferred when key phrases are used as output. An example of how key phrases can be used as output is when key phrases are presented to a user, for example, in the form of a word cloud.

Embodiments of the present invention allow for automatically (e.g. using a processor) creating part-of-speech patterns and filtering rules which may be used to automatically extract key phrases from a document containing text.

In the prior art, part-of-speech patterns are manually created. Using language speakers without linguistic training to select part-of-speech patterns for key phrase extraction is generally prohibitively inaccurate and time-consuming. Using language speakers with linguistic training to select part-of-speech patterns, while potentially more accurate, is nevertheless time-consuming and is generally prohibitively expensive.

Embodiments of the present invention may use an automated computer system to, on average, generate more accurate key phrases and take considerably less time and money to generate accurate rules for extracting key phrases when compared to traditional manual methods.

Further, embodiments of the present invention extract key phrases differently than a human would. A human would need to read the entirety or a part of the document's text from start to finish in order to be able to know which phrases contained in the text describe a topic of the document's text.

In contrast, embodiments of the present invention allow for key phrase extraction without actually needing to read and understand the entirety or a part of the document's text to extract key phrases. For example, a human usually reads a document from start to finish to understand the context of the combinations of words used to figure out what a topic of the document is, and then the human is able to determine which combinations of words from the document indicate the topic of document.

In contrast, some embodiments of the present invention may automatically generate key phrase extraction rules and a filter set of key phrases which can be used to automatically extract key phrases from a document's text by simply searching for sequential words which match key phrase extraction rules and which do not fall within a filter set of key phrases. Typically, a computer does not need to understand the meaning or context of individual words, or the meaning or context combinations of words, to search for sequential words which match key phrase extraction rules and which do not fall within a filter set of key phrases. Rather, by assigning a part-of-speech to each word in a document, the computer can simply search for a part-of-speech pattern without needing to understand the meaning or context of any of the words individually or in combination.

For example, when searching for a part-of-speech pattern, the computer may view the sentence "I went to the grocery store to buy groceries", as "pronoun+verb+preposition+article+noun+noun+preposition+verb+noun", because the actual lexical meaning of a word has nothing to do with searching for a particular sequence of parts-of-speech. Thus, if a computer was looking for the part-of-speech patterns "noun+noun" and "verb+noun", the computer would be able to find "grocery store" and "buy groceries" from the sentence without needing to actually read and understand the sentence. Further, the computer would not need to understand the meaning of word or set of words to be able to identify if a word or phrase extracted using a part-of-speech pattern is a word or phrase in the filter set of key phrases.

For example, some embodiments of the present invention do not require part-of-speech hierarchy or any manual input besides the initial manual key phrases annotation, thus, embodiments of the present invention may allow for immediate operation for different languages and text channels, only requiring a language speaker (even without linguistic training) to identify key phrases from a corpus sample.

Further, some embodiments of the present invention do not rely on human judgment for optimizing the key phrase rule generation, but, rather, utilizes a corpus sample of documents containing text, and a processor to iteratively test the accuracy of the key phrase generation rule until optimal rule accuracy is achieved. By utilizing a corpus sample of documents containing text, and iteratively testing the accuracy of the key phrase generation rule against this corpus sample, some embodiments of the present invention can create more accurate key phrase generation rules than those created based on human judgment calls.

BRIEF DESCRIPTION OF THE DRAWINGS

The foregoing and other objects, features, and advantages of embodiments of the present invention, as well as the invention itself, are more fully understood from the following description of various embodiments, when read together with the accompanying drawings.

FIG. 2A depicts an example of a document containing text from a corpus sample, and a plurality of identified key phrases from the text according to embodiments of the present invention FIG. 3 is a flow diagram illustrating a method for generating a filter set of key phrases according to embodiments of the present invention.

Figure 1:
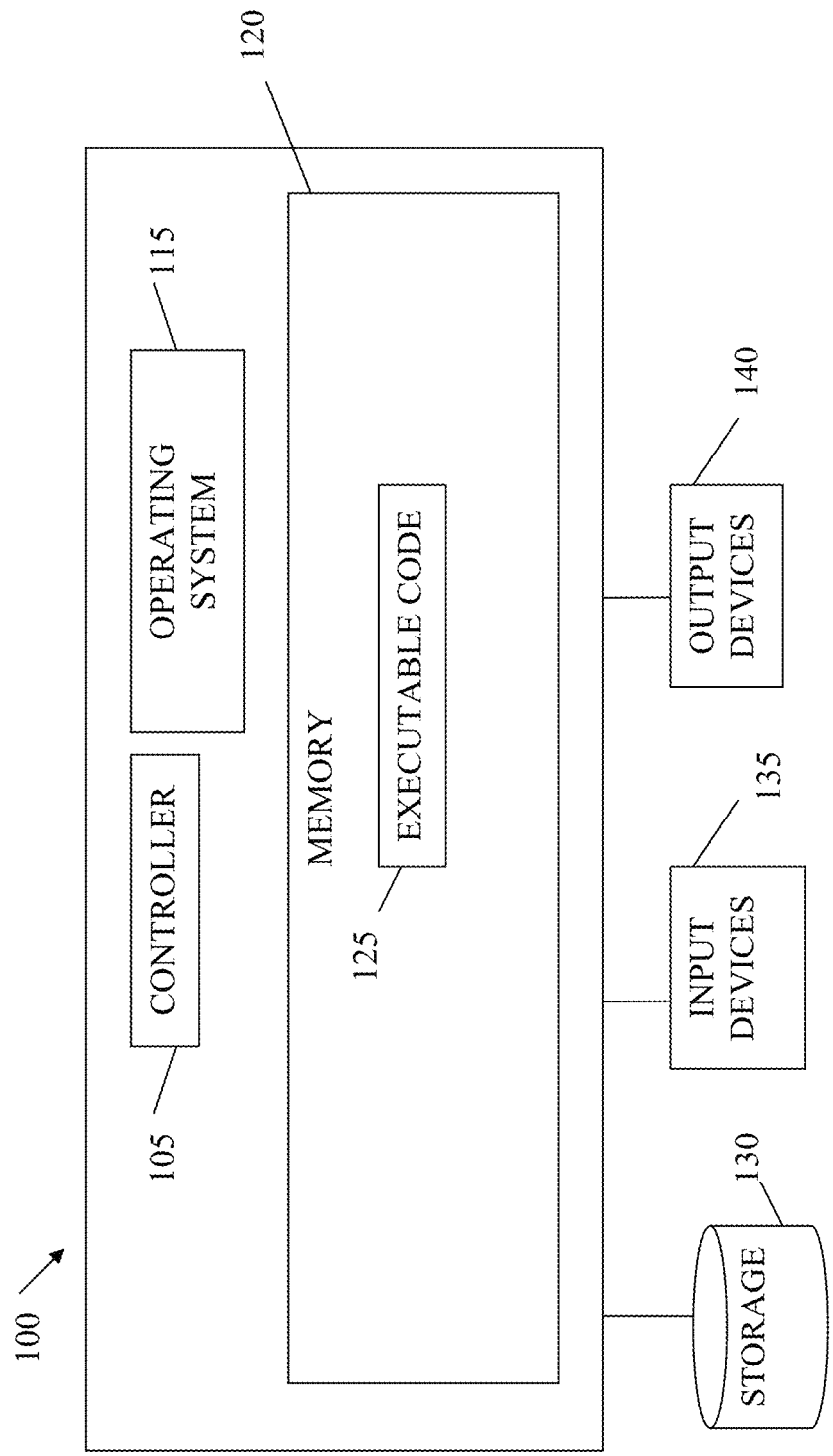
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that embodiments of the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the embodiments of the method described herein are not constrained to a particular order or sequence. Additionally, some of the described embodiments of the method or elements thereof may occur or be performed simultaneously, at the same point in time, or concurrently.

Reference is made to FIG. 1, showing a high level block diagram of an exemplary computing device 100 according to embodiments of the present invention. Computing device 100 may be a personal computer, desktop computer, mobile computer, laptop computer, and notebook computer or any other suitable device such as a cellular telephone, personal digital assistant (PDA), video game console, etc.

Computing device 100 may include a controller 105 that may be, for example, a central processing unit processor (CPU), a chip or any suitable computing or computational device, an operating system 115, a memory 120, a storage 130, an input devices 135 and an output devices 140.

An employee of a first company may use a device such as computing device 100 to identify and store a list of identified key phrases from documents containing text in the language that the agent can read. The first company may utilize the computing device 100 to generate key phrase extraction rules and filter sets of key phrases, or to optimize generated key phrases which may be used to extract key phrases from subsequently received documents in order to know a topic of the subsequently received document without actually needing to read and understand the documents. For example, if one were to read only the combination of extracted key phrases from a particular document which are not contained on the filter set, one would be able to understand the topic of the document without reading all of the rest of the words.

The first company may utilize computing device 100 to generate and/or optimize the key phrase extraction rules and filter sets of key phrases which may be provided to a second company. The second company may for example operate an internet database which performs archiving. The second company may use the key phrase extraction rules and filter sets of key phrases to quickly find key phrases which allow classification of different documents into different topics without actually needing to have a human read the documents. For example, if a document had an extracted key phrase "sea turtles", "coral reef", and "giant squid", the document may be about marine life.

As another example, the second company may provide search engine services, which wants searches documents for certain words, but also ranks the results based on relevance. For example, documents with extracted key phrases which match a search term could be higher ranked than documents which merely contains a search term not contained in a specific part-of-speech pattern.

Other embodiments may be used with other examples of uses and companies, and in other embodiments it is not necessary for one company to develop rules and another to use them; the same organization may both use and develop rules.

Operating system 115 may be or may include any code segment designed and/or configured to perform tasks involving coordination, scheduling, arbitration, supervising, controlling or otherwise managing operation of computing device 100, for example, scheduling execution of programs. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 105 possibly under control of operating system 115. For example, executable code 125 may be an application for adaptive tuning via automated simulation and optimization. Computing device 100 and executable code 125 may be configured to update, process and/or act upon information at the same rate the information, or a relevant event, are received. In some embodiments, more than one computing device 100 may be used. For example, a plurality of computing devices that include components similar to those included in computing device 100 may be connected to a network and used as a system.

Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Corpus samples, key phrase extraction rules, and filter sets may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a modem, printer or facsimile machine, a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out embodiments of the method disclosed herein. For example, a storage medium such as memory 120, computer-executable instructions such as executable code 125 and a controller such as controller 105.

The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multipurpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the embodiments of the method described herein are not constrained to a particular order or sequence. Additionally, some of the described embodiments of the method or elements thereof may occur or be performed at the same point in time.

Figure 2:
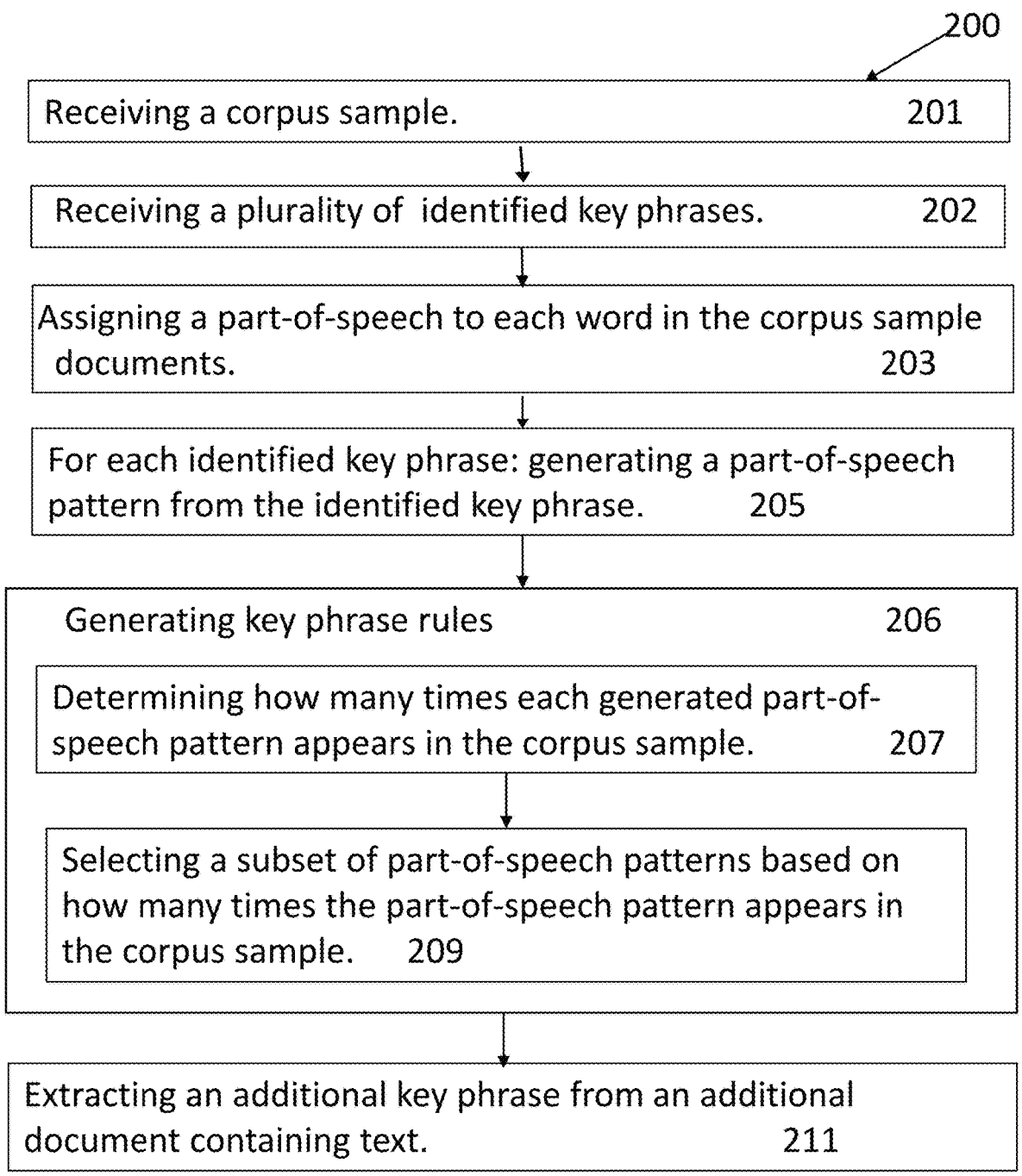
FIG. 2 is a flow diagram illustrating a method for automatic key phrase rule generation for automatic key phrase extraction according to embodiments of the present invention.

FIG. 2 is a flow diagram illustrating a method 200 for automatic key phrase rule generation for automatic key phrase extraction according to embodiments of the present invention.

Embodiments of the present invention may include receiving a corpus sample (operation 201) (e.g., receiving, by the processor 100, as shown above in FIG. 1). The corpus sample may include a plurality of documents containing text.

Each document in the corpus sample may have a text type such as a SMS message, a text book, a journal, a blog post, a novel, a website, a recorded call converted to text, or an email. In some embodiments of the invention, each document in the corpus sample may have the same text type. In some embodiments of the invention, each document in the corpus sample may be in the same language.

A plurality of identified key phrases may be received (operation 202) (e.g., receiving, by the processor 100, as shown above in FIG. 1). For example, any person that can read the language that a document is written in can read the document and identify phrases to create a list of identified key phrases which may allow one to know the topic of the document without actually reading the document. Each identified key phrase may be at least one word from the text of at least one corresponding document of the corpus sample, and may relate to a topic of the text of the corresponding document. In a typical embodiment, an identified phrase is a phrase identified by a human reader, and a generated phrase is created by a computer; in other embodiments "identified" key phrases may be created by a computer.

In some embodiments of the invention, at least 1,500 identified key phrases are received. For each document received in operation 201, a person who can read that the document may manually select key phrases or create a list of key phrases from that document.

FIG. 2A depicts an example of a document 551 containing text from a corpus sample, and a plurality of identified key phrases 553 from the document 551.

A part-of-speech may be assigned to each word in the document (operation 203), and a part-of-speech pattern may be generated from the identified key phrase parts-of-speech (operation 205) (e.g., assigning and generating, by the processor 100, as shown above in FIG. 1). As used herein, a "part-of-speech" is a linguistic category describing a particular word, such as, without limitation, "noun", "verb" and "adjective". The part-of-speech pattern may be a sequence, series or list of each part-of-speech assigned to each word in the identified key phrases.

For example, a key phrase may be "loose headphone", and the part-of-speech pattern for "loose headphone" may be "adjective+noun".

Key phrase extraction rules may be generated (operation 206) (e.g., generating, by the processor 100, as shown above in FIG. 1). The key phrase extraction rules may be utilized by a processor to automatically extract key phrases from a document so that a person does not need to read the document to know what the topic(s) of the document. For example, key phrases may be used for summarization, clustering and categorization purposes. For example, if a processor extracted the key phrases of "sea turtle" and "declining birth rate", one would be able to know that the topic of the document may be the declining birth rates of sea turtles without needing to actually read the whole document.

Further, a company which operates an internet database for archiving may use the key phrase extraction rules and filter sets of key phrases to quickly find key phrases which allow classification of different documents into different topics without actually needing to have a human read the documents. For example, if a document had an extracted key phrase "sea turtles", "coral reef", and "giant squid", the document may be about marine life.

Further, a company which owns a search engine may want to not only search documents for certain words, but to also rank the results based on relevance. For example, documents with extracted key phrases which match a search term could be higher ranked than documents which merely contains a search term not contained in a specific part-of-speech pattern.

The key phrase extraction rules may include for example a subset of part-of-speech patterns for identifying potential key phrases to extract. In some embodiments of the invention, the key phrase extraction rules include a filter set of phrases for excluding potential key phrases from extraction.

A number of times or number of appearances each generated part-of-speech pattern appears in at least a portion (or the entire document) of the at least one document may be determined (operation 207) (e.g., determining, by the processor 100, as shown above in FIG. 1). In some embodiments of the invention, the number of times each generated part-of-speech pattern appears in the entirety of the at least one document may be determined.

The subset of part-of-speech patterns may be selected based on how many times the part-of-speech pattern appears in at least the portion of the at least one document (operation 209) (e.g., selecting, by the processor 100, as shown above in FIG. 1). A part-of-speech pattern may be selected for the part-of-speech pattern subset if the part-of-speech pattern appears more than a predetermined number or amount of times in at least the portion of the at least one document. In some embodiments of the invention, a part-of-speech pattern may be selected if the part-of-speech pattern appears more than a predetermined amount of times in the entirety of the at least one document.

The predetermined number of times may be one time.

The part-of-speech pattern subset may be utilized to extract additional key phrases from an additional document containing text in order to determine a topic of the additional document (operation 211) (e.g., extracting, by the processor 100, as shown above in FIG. 1). A computer which extracts additional key phrases from the additional document may be a different computer than the computer which selects the pat-of-speech pattern subset.

Each part-of-speech pattern may be grouped according to a text type of the document from which the part-of-speech pattern was generated. In some embodiments of the invention, each part-of-speech pattern may be grouped according to a language of the document from which the part-of-speech pattern was generated.

FIG. 3 is a flow diagram illustrating a method 300 for generating a filter set of key phrases according to embodiments of the present invention.

Embodiments of the present invention may include, for each part-of-speech pattern from a part-of-speech pattern subset, generating at least one generated key phrase from a corpus sample (operation 301) (e.g., generating, by the processor 100, as shown above in FIG. 1). The corpus sample may be the corpus sample received in operation 201 of FIG. 2.

For each generated part-of-speech pattern, whether the generated key phrase is included in the corpus sample more than a second predetermined number or amount of times, or appearances, may be determined (operation 303) (e.g., determining, by the processor 100, as shown above in FIG. 1).

For each generated part-of-speech pattern, whether the generated key phrase is an identified key phrase may be determined (operation 305) (e.g., determining, by the processor 100, as shown above in FIG. 1). The identified key phrase may be an identified key phrase from operation 202 of FIG. 2.

For each generated part-of-speech pattern, the generated key phrase may be added to, or included in, the filter set if: the generated key phrase is included in the corpus sample more than the second predetermined amount of times, and the generated key phrase is not included in the set identified key phrases. (operation 307) (e.g., adding, by the processor 100, as shown above in FIG. 1).

As used herein, a "filter set" may be a set of phrases that may be excluded or removed from the key phrase set. The filter set may include phrases that would not give a reader insight, or good insight, into a topic of any document in the corpus sample. Filter phrases may be phrases which, regardless of the document, provide little or no insight into a topic of the document. For example, examples of phrases that may be included in the filter set may include "hold on please", "same time", and "other hand".

The second predetermined amount of times may be one.

Any generated key phrase added to the filter set may be removed from the set of at least one generated key phrase. In some embodiments of the invention, an extracted additional key phrase may not be extracted from an additional document, if the key phrase is included in the filter set.

Figure 4:
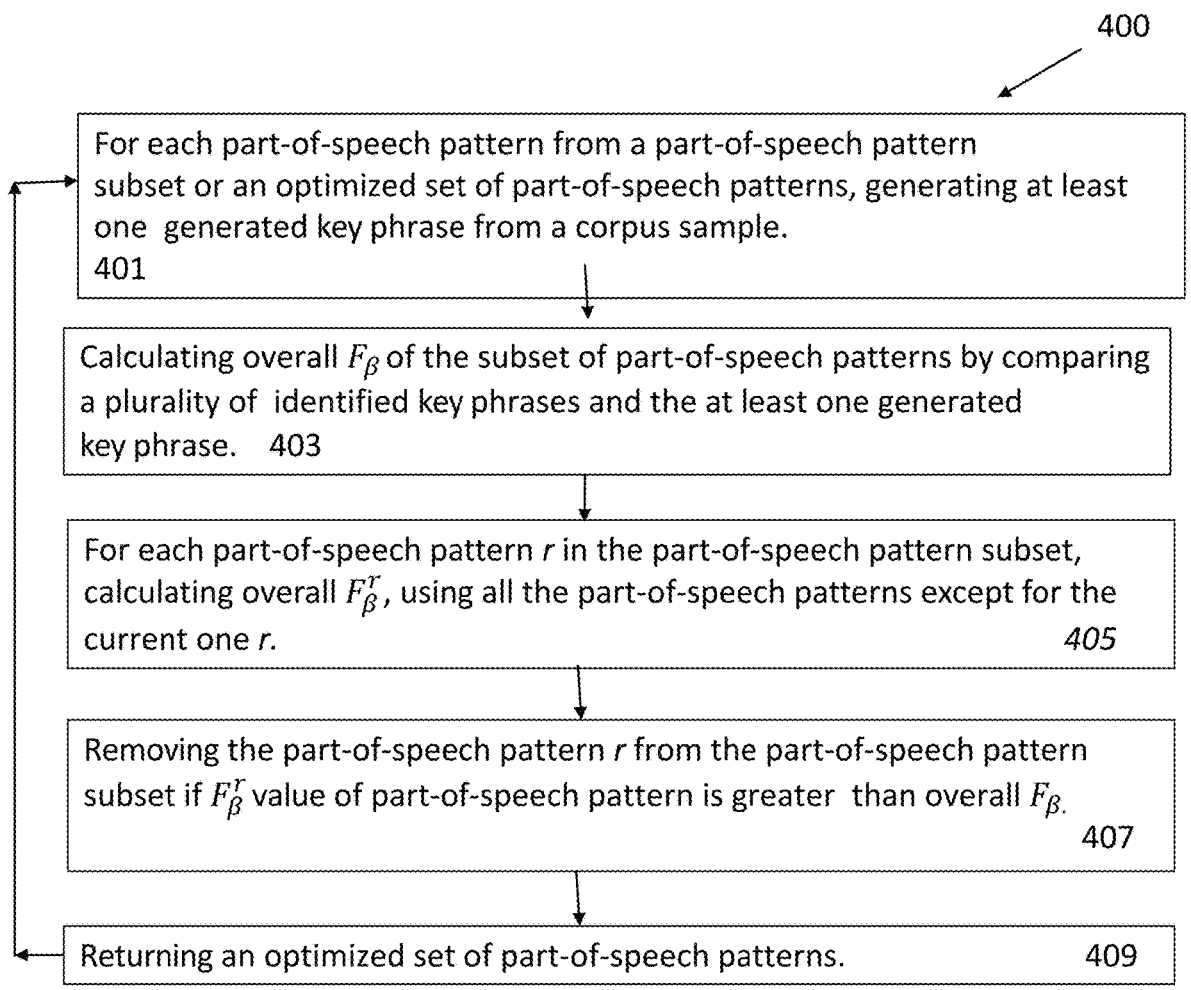
FIG. 4 is a flow diagram illustrating a method for optimizing the part-of-speech pattern subset according to embodiments of the present invention.

FIG. 4 is a flow diagram illustrating a method 400 for optimizing a part-of-speech pattern subset. The part-of-speech pattern subset may be the part-of-speech pattern subset from operation 209 of FIG. 2

For each part-of-speech pattern from a part-of-speech pattern subset, such as the part-of-speech pattern subset selected in operation 209, at least one generated key phrase may be generated from a corpus sample (operation 401) (e.g., generating, by the processor 100, as shown above in FIG. 1).

An overall accuracy rating or score $F_\beta$ for each part-of-speech pattern from the part-of-speech pattern subset may be calculated or determined, for example, by comparing a plurality of identified key phrases such as those received in operation 202 with the at least one generated key phrase of the part-of-speech pattern subset (operation 403) (e.g., determining, by the processor 100, as shown above in FIG. 1).

The accuracy score may be, for example, an F-score, or another suitable rating or score. The F-score may be a measure of a test's accuracy which may consider both a precision and a recall of the test. Precision may be the fraction of generated relevant key phrases out of all key phrases generated. Recall may be the fraction of generated relevant key phrases from the identified key phrases (operation 202).

The F-score may be represented, for example, as:

$$F_\beta = (1+\beta^2) \cdot \text{precision} \cdot \text{recall} / (\beta^2 \cdot \text{precision}) + \text{recall} \qquad \text{EQN. 1}$$

where $\beta$ determines how many times more important recall is than precision in determining the F-score $\beta$ may be initially set at 1, unless other specifications from the product are provided, so that precision and recall are equally weighted. For example, a product user can specify whether precision or recall is more important for the product user's use, and $\beta$ may be set accordingly, or the user can be presented with alternative settings using various $\beta$ values (e.g., $\beta=0.5$; $\beta=1$; $\beta=1.5$; $\beta=2$) and the product user can select the setting which works best for the product user's use.

For each part-of-speech pattern r in the part-of-speech pattern subset (operation 209), a specific accuracy score $F_\beta^r$ may be calculated, using all the part-of-speech patterns except the current part-of-speech pattern r (operation 405) (e.g., calculating, by the processor 100, as shown above in FIG. 1).

If $F_\beta^r$ value of part-of-speech pattern (operation 405) is greater than overall $F_\beta$ (operation 403), the part-of-speech pattern may be removed from the part-of-speech pattern subset (operation 407) (e.g., removing, by the processor 100, as shown above in FIG. 1).

The optimized part-of-speech subset may be generated (operation 409) (e.g., optimizing, by the processor 100, as shown above in FIG. 1).

Operations 403-409 may be iterated or repeated with different settings of $\beta$ in $F_\beta$ (e.g., =0.5; $\beta=1.5$; $\beta=2$) to present different possibilities in precision and recall. As explained herein, a product user can specify whether precision or recall is more important for the product user's use, or the product user can select the setting which works best for the product user's use from alternate settings using various $\beta$ values.

Figure 5:
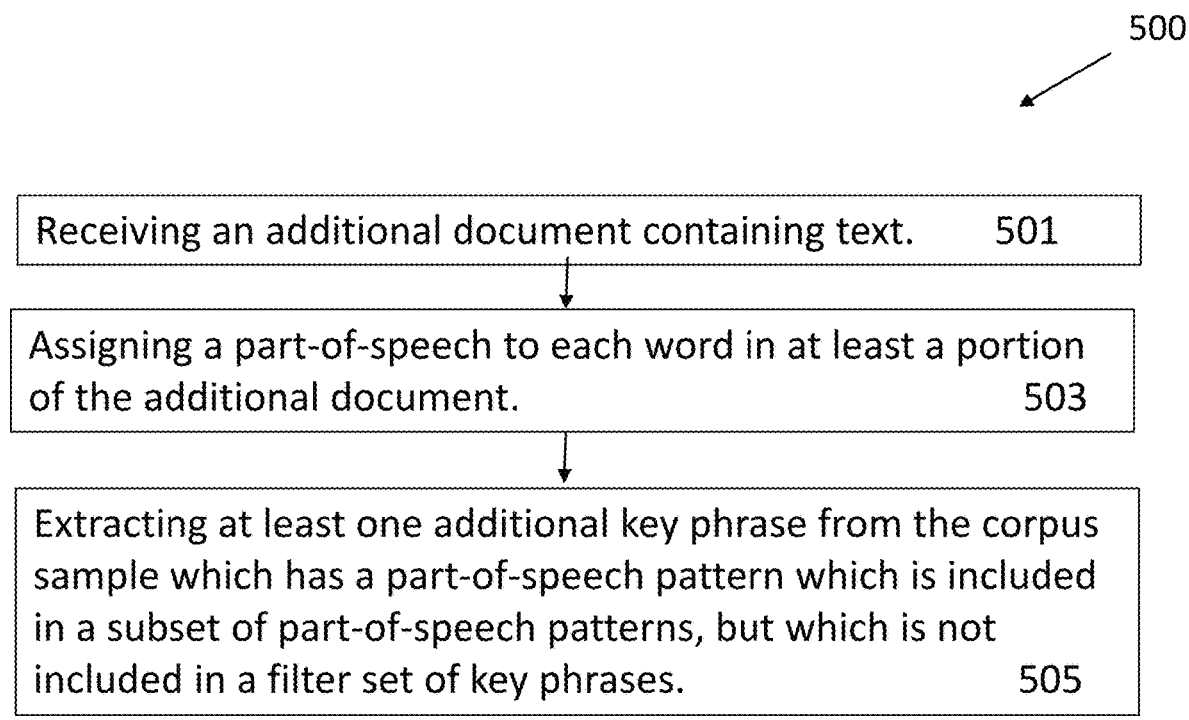
FIG. 5 is a flow diagram illustrating a method for automatic key phrase generation using key phrase rules and a filter set of key phrases according to embodiments of the present invention.

FIG. 5 is a flow diagram illustrating a method 500 for automatic key phrase generation using key phrase rules and a filter set of key phrases such as the key phrase rules generated in FIG. 2, and the filter set of key phrases generated in FIG. 3, according to embodiments of the present invention.

An additional document containing text may be received (operation 501) (e.g., receiving, by the processor 100, as shown above in FIG. 1). The additional document may contain a similar language and/or text type of the documents from which the part-of-speech pattern subset was generated.

A part-of-speech may be assigned to each word in at least a portion of the additional document (operation 503) (e.g., assigning, by the processor 100, as shown above in FIG. 1). In some embodiments of the invention, a part-of-speech may be assigned to each word in the entirety of the additional document.

At least one extracted additional key phrase may be extracted from the additional document (operation 505) (e.g., extracting, by the processor 100, as shown above in FIG. 1). The at least one extracted additional key phrase may be at least one word from the text of the additional document that includes a part-of-speech pattern from a part-of-speech pattern subset such as the part-of-speech pattern subset selected in operation 209, and which is not included in a filter set of key phrases from operation 307.

In some embodiments of the invention, the extracted additional key phrases may be at least two consecutive words from the text of the additional document. Each extracted additional key phrase may be used to determine at least one topic from the additional document.

Figure 6:
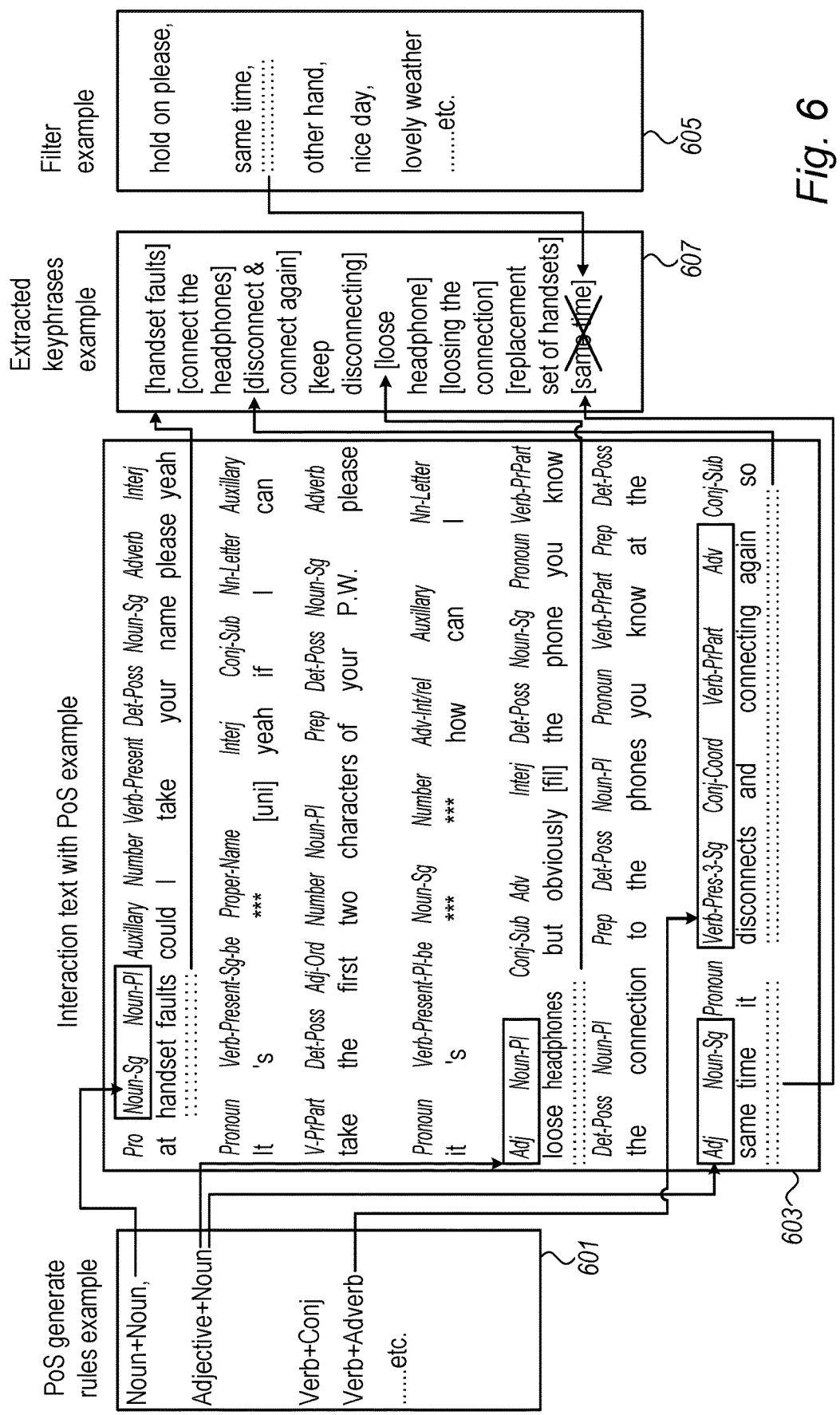
FIG. 6 depicts example extracted key phrases extracted from a document using a part-of-speech pattern subset, and a filter set according to embodiments of the present invention.

FIG. 6 depicts example extracted key phrases 607 extracted from the additional document 603 in operation 505 using the part-of-speech patterns selected for subset 601 selected in operation 209 and the filter set 605 from operation 307.

Unless explicitly stated, embodiments of the method described herein are not constrained to a particular order or sequence. Additionally, some of the described embodiments of the method or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for key phrase rule generation for key phrase extraction, comprising:
    receiving, by a processor, a plurality of identified key phrases, each identified key phrase including at least a plurality of consecutive words from a text of at least one corresponding document of a corpus sample and relating to a topic of the text of the document corresponding to the key phrase, the corpus sample including a plurality of documents comprising text;
    for each identified key phrase, generating, by the processor, a part-of-speech pattern from the identified key phrase, wherein the part-of-speech pattern is a sequence of parts-of-speech, where each part-of-speech in the sequence is assigned to a word in the identified key phrase;
    determining, by the processor, how many times each generated part-of-speech pattern appears in at least a portion of the at least one corresponding document;
    selecting, by the processor, a subset of generated part-of-speech patterns for extracting additional key phrases from an additional document based on how many times the part-of-speech pattern appears in at least the portion of the at least one document; and
    generating, by the processor, a filter set of key phrases which do not indicate a topic of any document in the corpus sample by:
        for each part-of-speech pattern from the subset of generated part-of-speech patterns, generating at least one generated key phrase from the corpus sample, wherein each generated key phrase comprises at least a plurality of consecutive words from the text of at least one document of the corpus sample, and each generated key phrase comprises a part-of-speech pattern from the subset of generated part-of-speech patterns; and
        for each generated key phrase, adding, by the processor, the generated key phrase to the filter set if:
            the generated key phrase appears in the corpus sample more than a second predetermined amount of times, and the generated key phrase does not appear in the plurality of identified key phrases, and removing, by the processor, the generated key phrase from the set of at least one generated key phrase if the generated key phrase was added to the filter set of key phrases.

2. The method according to claim 1, wherein a part-of-speech pattern is selected for the subset of generated part-of-speech patterns if the part-of-speech pattern appears more than a predetermined amount of times in at least the portion of the at least one document.

3. The method according to claim 2, wherein the predetermined amount of times is one time.

4. The method according to claim 1, wherein the second predetermined amount of times is one time.

5. The method according to claim 1, wherein the extracted additional set of at least one key phrase does not comprise a key phrase from the filter set of key phrases.

6. The method according to claim 1, further comprising determining, by the processor, an accuracy score of the plurality of part-of-speech patterns.

7. The method according to claim 6, further comprising, for each part-of-speech pattern in the subset of generated part-of-speech patterns:
determining, by the processor, an accuracy score of the plurality of part-of-speech patterns without the current part-of-speech pattern, and
if the accuracy score of the part-of-speech pattern is above the accuracy score of the plurality of part-of-speech patterns, removing, by the processor, the part-of-speech pattern from the subset of generated part-of-speech patterns.

8. The method according to claim 7, wherein the determination of the accuracy score comprises determining a precision and a recall of the part-of-speech pattern.

9. The method according to claim 1, wherein at least 1,500 identified key phrases are received.

10. A system for key phrase rule generation for key phrase extraction, comprising a memory; and
a processor, the processor configured to:
receive a plurality of identified key phrases, each identified key phrase including at least a plurality of consecutive words from a text of at least one corresponding document of a corpus sample and relating to a topic of the text of the document corresponding to the key phrase, the corpus sample including a plurality of documents containing text;
generate, for each identified key phrase, a part-of-speech pattern from the identified key phrase, wherein the part-of-speech pattern is a sequence of parts-of-speech, where each part-of-speech in the sequence is assigned to a word in the identified key phrase;
determine how many times each generated part-of-speech pattern appears in at least a portion of the at least one corresponding document;
select a subset of generated part-of-speech patterns for extracting additional key phrases from an additional document based on how many times the part-of-speech pattern appears in at least the portion of the at least one document;
for each part-of-speech pattern from the subset of generated part-of-speech patterns, generate at least one generated key phrase from the corpus sample, wherein each generated key phrase is at least a plurality of consecutive words from the text of at least one document of the corpus sample, and each generated key phrase comprises a part-of-speech pattern from the subset of generated part-of-speech patterns; and for each generated key phrase, add the generated key phrase to a filter set of key phrases which do not indicate a topic of any document in the corpus sample if:
the generated key phrase is comprised in the corpus sample more than a second predetermined amount of times, and
the generated key phrase is not comprised in the plurality of identified key phrases, and
remove the generated key phrase from the set of at least one generated key phrase if the generated key phrase was added to the filter set of key phrases.

11. The system according to claim 10, wherein the processor is configured to select a part-of-speech pattern for the subset of generated part-of-speech patterns if the part-of-speech pattern appears more than a predetermined amount of times in at least the portion of the at least one document.

12. The system according to claim 10, wherein the processor is configured to, for each part-of-speech pattern in the subset of generated part-of-speech patterns:
determine an accuracy score of the plurality of part-of-speech patterns without the current part-of-speech pattern, and
if the accuracy score of the part-of-speech pattern is above the accuracy score of the plurality of part-of-speech patterns, remove the part-of-speech pattern from the subset of generated part-of-speech patterns.

13. The system according to claim 12, wherein the processor determining the accuracy score comprises the processor determining a precision and a recall of the part-of-speech pattern.

14. A method, comprising:
receiving, by a processor, a plurality of documents, each document comprising text; receiving, by the processor, key phrases, each identified key phrase comprising at least a plurality of consecutive words from the corresponding document and each identified key phrase relating to a topic of the document corresponding to the keyphrase;
determining a part-of-speech for each word in the documents;
for each key phrase, creating, by the processor, a pattern from the key phrase, wherein the pattern is a series of parts-of-speech, where each part-of-speech in the series is assigned to a word in the key phrase; and
creating, by the processor, rules by:
determining, by the processor, how many appearances each generated pattern makes in at least a portion of the at least one document;
selecting, by the processor, a subset of created patterns for extracting key phrases from an additional document, wherein:
the selection is based on the appearances of the pattern in the document, and
extracting key phrases including a pattern from the subset of created patterns, wherein the extracted key phrase comprises at least a plurality of consecutive words from the additional document that relates to a topic of the additional document; and
generating, by the processor, a filter set of key phrases which do not indicate a topic of any document in the corpus sample by:
for each parts-of-speech pattern from the generated patterns, generating at least one generated key phrase from the documents, wherein each generated key phrase comprises at least a series of consecutive words from the text of at least one document from the plurality of documents, and each generated key phrase comprises a parts-of-speech pattern from the generated patterns; and for each generated key phrase, adding, by the processor, the generated key phrase to the filter set if:

the generated key phrase appears in the plurality of documents more than a second predetermined amount of times, and the generated key phrase does not appear in the plurality of identified key phrases, and removing, by the processor, the generated key phrase from the set of at least one generated key phrase if the generated key phrase was added to the filter set of key phrases.

15. The method according to claim 14, wherein generating key phrase rules comprises determining, by the processor, an accuracy score of the plurality of part-of-speech patterns.

\* \* \* \* \*

UNITED STATES PATENT AND TRADEMARK OFFICE
CERTIFICATE OF CORRECTION

PATENT NO. : 11,507,743 B2
APPLICATION NO. : 15/444443
DATED : November 22, 2022
INVENTOR(S) : Inna Achlow It is certified that error appears in the above-identified patent and that said Letters Patent is hereby corrected as shown below:

In the Specification

Column 11, Line 7 insert as follows:

$$F_\beta = (1 + \beta^2) \cdot \frac{precision \cdot recall}{(\beta^2 \cdot precision) + recall} \qquad \text{EQN. 1}$$

Signed and Sealed this
Fifth Day of September, 2023

*Katherine Kelly Vidal*
*Director of the United States Patent and Trademark Office*